Figure 1:
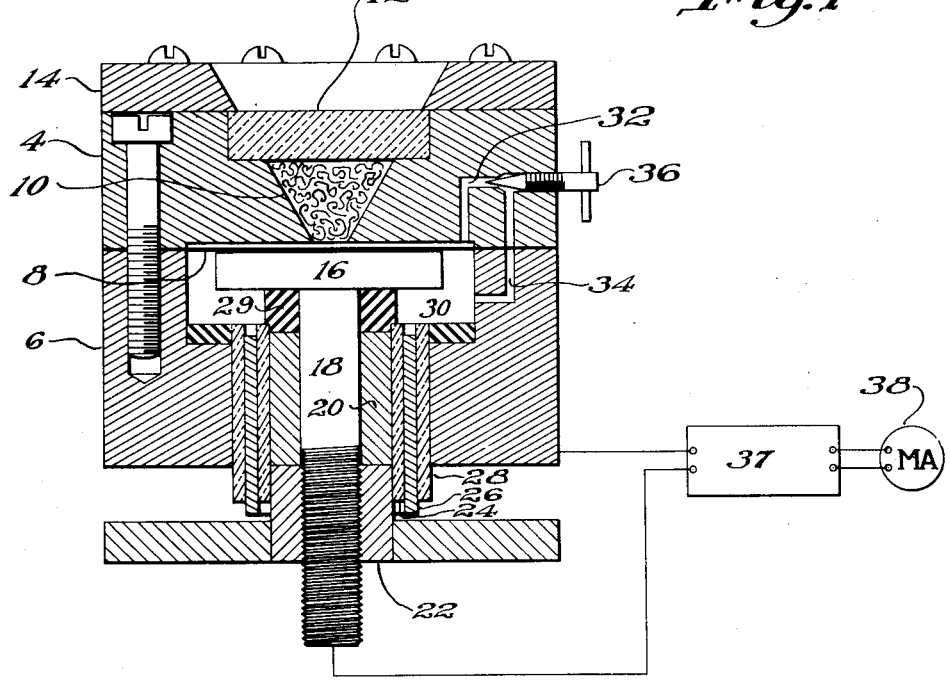

April 26, 1938.    W. M. HALL    2,115,578
RADIANT ENERGY RECEIVER
Filed Oct. 31, 1936

Witness
Paul F. Bryant

Inventor
William M. Hall
by his attorneys
Fish Hildreth Cary & Jenney

Patented Apr. 26, 1938

2,115,578

UNITED STATES PATENT OFFICE 2,115,578

RADIANT ENERGY RECEIVER

William M. Hall, Lexington, Mass., assignor to Hammond V. Hayes, Boston, Mass.

Application October 31, 1936, Serial No. 108,582

4 Claims. (Cl. 250—1)

The present invention relates to methods and apparatus for radiant energy reception, and more particularly to methods and apparatus involving devices of the general type disclosed in the patent to Hayes No. 1,954,204, granted April 10, 1934.

The receiving apparatus disclosed in the Hayes patent comprises a chamber enclosing a body of dark heat-absorbing substance which is sensitive to radiant energy over a wide range of frequencies, together with a member such as a diaphragm which is influenced by the pressure changes induced by the dark substance. The dark substance may also possess gas-occluding properties which further contribute to the changes of pressure upon the diaphragm. The receiver is one of extreme sensitivity, and finds a variety of uses, for example, detection of bodies which are of different temperature from the surroundings, measurement of radiation from a distant emitter such as a star, signalling through fog, etc. The development of the device has, however, encountered some problems, one of which relates to the influence of ambient temperatures upon the sensitivity. In the best form of the invention yet devised, the diaphragm forms one electrode of a condenser and is spaced by a very short gap from a fixed electrode. Changes in ambient temperature affect the pressure of the gas in the chamber containing the dark substance and hence tend to flex the diaphragm from its normal position. The response upon reception of radiant energy is determined, among other factors, by the ratio change of capacitance to the initial capacitance of the condenser. It is therefore desirable that the diaphragm should always assume a constant zero or normal position, regardless of ambient conditions, and this is particularly important if precise calibration is required for measurement work.

According to the preferred form of the present invention, there is provided a restricted by-pass between opposite sides of the diaphragm, to permit a slow or gradual equalization of pressure on opposite sides thereof, and thus to insure a balanced pressure which, except when radiant energy is being received, maintains the diaphragm in a constant normal position. The by-pass is sufficiently small so that it is not immediately affected by any rapid pressure changes, such as are caused by use of the instrument for radiant energy reception.

The device of the present invention is particularly sensitive to abrupt pulses of radiant energy, and another feature of the invention involves a method of radiant energy detection in which the dark substance is impulsively excited, preferably at a low frequency. This method is especially suitable for infra-red signaling through fog.

Other features of the invention relate to certain features of construction hereinafter described and particularly defined in the claims.

Figure 2:
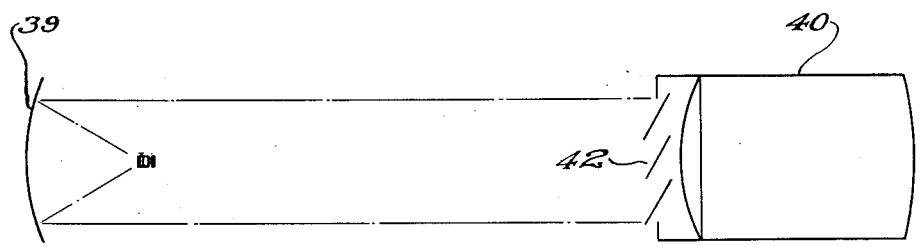

In the accompanying drawing, Fig. 1 is a sectional elevation of the preferred instrument according to the present invention, and Fig. 2 is a diagram illustrating a method of radiant energy signaling.

The receiver illustrated in Fig. 1 comprises a two-part casing having a head 4 and a body 6, between which is secured a diaphragm 8. The head is formed with a conical chamber 10 within which is retained a body of finely divided dark substance, such as carbonized vegetable fibres in the form of a fine fluff. The chamber is covered by a window 12, preferably of rock salt if response to radiant energy in both the visible and infrared region is desired. The window is held in place by a plate 14.

Co-operating with the diaphragm, which forms one electrode of a condenser, is a back electrode 16 in the form of a disk mounted on a rod 18. The rod fits within a sleeve 20, and near its outer end is threaded for engagement with a nut 22. The sleeve 20 and nut 22 are received within a sleeve 24 of high specific electrical resistance, such as glass. The sleeve 24 is received within a metal sleeve 26 which in turn is received within another insulating sleeve 28. The several sleeves 20, 24, 26 and 28 are all cemented together and the outer sleeve is cemented within the body 6. The threaded rod 18 allows adjustment of the back electrode during manufacture, this adjustment being ordinarily such as to give a gap of the order of magnitude of one one-thousandth of an inch. Back-lash is taken up by a rubber ring 29 between the back electrode and the sleeve 20.

The space around the back electrode forms a back chamber 30. This chamber is connected with the chamber at the front of the diaphragm by a by-pass which is formed by drilled passages indicated at 32 and 34. Fitting within the passage 32 is the tapered end of a needle valve 36 which for purposes of adjustment is mounted in the head with a fine thread.

The casing and the rod 18 form opposite terminals of the device and are connected to an amplifier 37 which is connected to operate a suitable response instrument. The response instrument is herein illustrated as a milliameter 38, although any electrical response instrument such as a sensitive relay or any desired measuring device may be employed.

The invention finds its greatest usefulness in the detection of single impulses, or a succession of impulses at low frequency. As an example, there is shown in Fig. 2 a signaling system, embodying a receiver placed at the focus of a parabolic reflector 39. A distant transmitter 40 comprises an arc lamp provided with shutters 42. The transmitter is preferably arranged to emit radiant energy over a wide range of wave lengths from the visible spectrum to the longer infra-red. For the purpose of facilitating navigation through fog, the transmitter may be set up as a stationary beacon and the receiver may be carried on shipboard, or if desired both the transmitter and receiver may be mounted on the ship, with provision for orientation together, and suitable reflectors, preferably of the tetrahedral type, may be placed in strategic positions with relation to the harbor or channel. If desired, reliance can be placed on the reflection of the longer rays from buoys, beacons or other objects on which the rays may fall.

The shutters 42 are arranged to be opened and closed quickly, so that the transmitter emits pulses which start and stop abruptly. The frequency of operation is, however, fairly low preferably not faster than once a second.

The operation is as follows: Assuming that the receiver is pointed to receive the rays from the transmitter, when the shutters are opened, an impulse of radiant energy falls on the dark substance, and its temperature, as well as that of the gas surrounding it, is raised. The gas consequently expands, thereby increasing the pressure sufficiently to flex the diaphragm. The increase of pressure is in the nature of a shock excitation extending over a very small fraction of a second, and is so rapid that there is no immediate leakage through the by-pass. The diaphragm is deflected to approximately the same extent as if no by-pass were provided. The change of capacitance thus produced is shown by the deflection of the meter. Immediately thereafter gas leaks through the by-pass, thus tending to equalize the pressures on both sides of the diaphragm and to move the diaphragm toward its normal position. The meter needle drifts back to zero, primarily as a consequence of the electrical characteristics of the capacitive circuit and the associated amplifier. When the shutters are closed, energy is dissipated from the dark substance, both by conduction of heat through the casing and by re-radiation. The gas contracts, the pressure in front of the diaphragm is diminished, and the diaphragm is flexed in the opposite direction to give a reverse movement of the meter needle. Gas then leaks through the by-pass in the opposite direction, and the diaphragm is restored to its normal position in readiness for the next impulse.

The invention may be used for many other purposes, such as the detection of bodies which are at different temperatures from the surroundings. One example is the detection of aircraft by radiant energy emitted therefrom, and another is the detection of icebergs in which case the radiant energy may be considered as negative since it passes from rather than into the receiver. In any case, when the body of higher or lower temperature than its surroundings enters into or moves out of the field of the receiver, an impulsive pressure change occurs within the fluff chamber, and this impulse is registered electrically as above described. Furthermore, the instrument is capable of accurate calibration so that it may be used for measurement of radiant energy emitted from any source; for example, it is especially suited, because of its extreme sensitivity, to the measurement of stellar radiation.

In the description thus far, the operation of the instrument has been explained without particular reference to the by-pass, except in the performance of its function in tending to eqalize pressures between signaling pulses. The primary function of the by-pass is, however, to maintain the instrument uninfluenced by ambient conditions, which are the external temperature and the intensity of the background radiation. By background radiation is meant radiation from sources other than the particular source of the signal impulses to be received.

The function of the by-pass may be best understood by first considering the operation of an instrument in which no by-pass is provided. In such an instrument any change of temperature or background radiation will change the pressure in the fluff chamber and flex the diaphragm. The electrical response depends on the rate of the change, as well as on its magnitude, hence a slow ambient change would merely act to move the diaphragm to a new zero position without necessarily producing a measurable indication, whereas a more rapid change might actually give an undesirable response in interference with the signal to be detected.

In signaling, it is essential to distinguish sharply between the signal pulse and the ambient change, and to this end, it is desirable to use signal pulses which are started and stopped abruptly; in other words, the rate of change of the signal pulse is to be greater than the rate of any ambient changes likely to be encountered. The by-pass acts to improve this differentiation. It does not materially reduce the sensitivity of the receiver to the shock excitation of an abrupt impulse, but greatly diminishes the effect of an ambient change which might otherwise interfere with the signal.

The other effect mentioned above, namely the change of the zero position of the diaphragm, is to change the initial capacitance of the condenser and thus to change the responsiveness of the instrument to any impulse which may thereafter be received. This effect may be of only secondary importance in signaling work except where the ambient conditions would be such as to flex the diaphragm into actual contact with the back electrode, but it is of the greatest importance in measurement work where precise calibration is necessary. With the by-pass, however, any ambient change is followed by a practically immediate equalization of pressure on both sides of the diaphragm. Thus the normal position of the diaphragm and the sensitivity of the instrument remain substantially unchanged.

A feature of some importance is the fact that the device avoids a difficult problem of assembly. Without the by-pass it has been found almost impossible to assemble the instrument without leaving an initial unbalanced pressure on the diaphragm. The unbalance would give a permanent set to the diaphragm in one direction or the other. It will be appreciated that the casing must be sealed tight against the atmospheric pressure, since any change of external pressure would affect the diaphragm. With the casing thus sealed there would be no opportunity for the unbalance to correct itself.

According to the present invention, the normal pressures on both sides of the diaphragm are always balanced. It may be noted that the casing must be tight against the outside pressure and this necessitates a fine and closely fitting thread on the needle valve.

When the instrument is to be used for a single purpose, the adjustable needle valve is not necessary, and a fixed capillary may be substituted, or if desired the by-pass may be provided by making an extremely small pin hole in the diaphragm.

The preferred form of the invention has been described as embodying a diaphragm which acts to translate pressure variations into electrical variations through a capacitive circuit. It will be understood, however, that the same principles are applicable regardless of the particular translating means, and the diaphragm may be associated with a magnetic or resistive translating circuit, if desired.

The invention having been thus described, what is claimed is:

1. Radiant energy receiving apparatus comprising a casing having two closed chambers, a diaphragm separating the chambers, one of the chambers including a dark heat-absorbing substance responsive to changes in radiant energy to effect changes in pressure on the diaphragm, and means co-operating with the diaphragm to form an electrical circuit responsive to the rate of deflection of the diaphragm, the diaphragm having a small hole therethrough to form a restricted by-pass between the chambers to permit equalization of the normal pressure in the chambers.

2. Radiant energy receiving apparatus comprising a casing having two closed chambers, a diaphragm separating the chambers, one of the chambers including a dark heat-absorbing substance responsive to changes in radiant energy to effect changes in pressure on the diaphragm, a back electrode in the other of said chambers and forming with the diaphragm a condenser the capacitance of which is changed by deflection of the diaphragm, and means forming a restricted by-pass between the chambers to permit equalization of the normal pressure in the chambers.

3. Radiant energy receiving apparatus comprising a casing having two closed chambers, a diaphragm separating the chambers, one of the chambers including a dark heat-absorbing substance responsive to changes in radiant energy to effect changes in pressure on the diaphragm, means co-operating with the diaphragm to form an electrical circuit responsive to the rate of deflection of the diaphragm, and means forming a restricted by-pass between the chambers to permit equalization of the normal pressure in the chambers.

4. Radiant energy receiving apparatus comprising a casing having two closed chambers, a diaphragm separating the chambers, one of the chambers including a dark heat-absorbing substance responsive to changes in radiant energy to effect changes in pressure on the diaphragm, a back electrode in the other of said chambers and forming with the diaphragm a condenser the capacitance of which is changed by deflection of the diaphragm, an electrical circuit responsive to the rate of deflection of the diaphragm, and means forming a restricted by-pass between the chambers to permit equalization of the normal pressure in the chambers.

WILLIAM M. HALL.